(12) United States Patent
Bromley

(10) Patent No.: US 10,942,044 B2
(45) Date of Patent: Mar. 9, 2021

(54) MONITORING SYSTEM AND METHOD

(71) Applicant: SMART COMPONENT TECHNOLOGIES LIMITED, Nottinghamshire (GB)

(72) Inventor: Roger Bromley, Nottinghamshire (GB)

(73) Assignee: SMART COMPONENT TECHNOLOGIES LIMITED, Sheffield (GB)

( * ) Notice: Subject to any disclaimer, the term of this patent is extended or adjusted under 35 U.S.C. 154(b) by 0 days.

(21) Appl. No.: 16/312,365

(22) PCT Filed: Jun. 20, 2017

(86) PCT No.: PCT/GB2017/051808
§ 371 (c)(1),
(2) Date: Dec. 21, 2018

(87) PCT Pub. No.: WO2017/221001
PCT Pub. Date: Dec. 28, 2017

(65) Prior Publication Data
US 2019/0226886 A1    Jul. 25, 2019

(30) Foreign Application Priority Data
Jun. 21, 2016   (GB) ..................................... 1610819

(51) Int. Cl.
| | | |
|---|---|---|
| *G01D 11/24* | (2006.01) | |
| *G01D 21/00* | (2006.01) | |
| *G01L 5/24* | (2006.01) | |
| *G01D 18/00* | (2006.01) | |
| *G01L 1/00* | (2006.01) | |
| *F16B 31/02* | (2006.01) | |

(52) U.S. Cl.
CPC ........... *G01D 11/245* (2013.01); *G01D 18/00* (2013.01); *G01D 21/00* (2013.01); *G01L 1/00* (2013.01); *G01L 5/243* (2013.01); *F16B 31/028* (2013.01)

(58) Field of Classification Search
CPC .. G01P 15/08; F42C 1/10; F42C 11/02; F42C 15/24; G01B 5/06; G01D 21/00; G01D 11/245; G01L 1/00
See application file for complete search history.

(56) References Cited

U.S. PATENT DOCUMENTS

| | | |
|---|---|---|
| 5,392,654 A | 2/1995 | Boyle |
| 8,521,448 B1 | 8/2013 | Ung et al. |
| | (Continued) | |

FOREIGN PATENT DOCUMENTS

| | | |
|---|---|---|
| CH | 222280 A | 7/1942 |
| DE | 102012020932 A1 | 4/2014 |
| | (Continued) | |

OTHER PUBLICATIONS

Written Opinion in corresponding PCT Application No. PCT/GB2017/051808, dated Sep. 18, 2017.
(Continued)

*Primary Examiner* — Jamel E Williams
(74) *Attorney, Agent, or Firm* — Leason Ellis LLP

(57) ABSTRACT

The invention resides in a sensor unit (100) for measuring and monitoring a plurality of parameters associated with an asset or equipment (126, 128) having a fixing connected thereto. The asset can typically be an object, such as a rail or motor casing, that is fixed, using a fixing (122) such as a bolt. The sensor unit has a housing (112) having a portion (120) for receiving a fixing therethrough; sensors (114) arranged to measure and/or monitor (i) parameters associated with a fixing that is secured to the asset via housing and/or (ii) parameters influencing the performance of the asset; a processor (142) configured to process data from the sensors; and a communicator (116) adapted to transmit said data to a remote device. At least one of the sensors can be an inductive sensor, which can measures the displacement or force applied to a fixing against the asset to which it is fixed,
(Continued)

said fixing is biased against a resilient member located in the housing. The sensor unit can operate in at least one of a plurality of modes including: a first mode, in which the sensor unit samples one or more parameters periodically at a first sample rate, a second mode, in which the sensor unit detects the occurrence of an event, and a third mode, in which the sensor unit monitors one or more parameters periodically at a second sample rate, which second sample rate is greater than the first sample rate, and wherein the data obtained in said modes is communicable with the system and/or the reader.

22 Claims, 9 Drawing Sheets

(56) References Cited

U.S. PATENT DOCUMENTS

| | | | |
|---|---|---|---|
| 9,483,674 B1 | 11/2016 | Fink et al. | |
| 9,679,235 B2 * | 6/2017 | Sugar | G06K 19/0702 |
| 2002/0029640 A1 | 3/2002 | Shirato et al. | |
| 2003/0233888 A1 | 12/2003 | Gierling | |
| 2007/0025823 A1 | 2/2007 | Hockersmith | |
| 2009/0145249 A1 * | 6/2009 | Dubbeldam | G01D 11/30 73/866.5 |
| 2015/0302288 A1 * | 10/2015 | Sugar | G06K 19/07758 235/492 |
| 2015/0337884 A1 | 11/2015 | Ceney | |

FOREIGN PATENT DOCUMENTS

| | | | |
|---|---|---|---|
| DE | 102013000597 A1 * | 7/2014 | G01L 1/2231 |
| DE | 102013000597 A1 | 7/2014 | |
| FR | 3025883 A3 | 3/2016 | |
| WO | 2012167968 A1 | 12/2012 | |

OTHER PUBLICATIONS

International Search Report in corresponding PCT Application No. PCT/GB2017/051808, dated Sep. 18, 2017.
International Preliminary Report on Patentability in corresponding PCT Application No. PCT/GB2017/051808, dated Dec. 25, 2018.
British Examination Report in corresponding British Patent Application No. GB1709853.4 dated Dec. 21, 2017. 7 pages.

* cited by examiner

MONITORING SYSTEM AND METHOD

CROSS-REFERENCE TO RELATED PATENT APPLICATIONS

This application is a U.S. National Stage Application under 35 U.S.C. § 371 of International Patent Application No. PCT/GB2017/051808, filed 20 Jun. 2017, which claims the benefit of priority under 35 U.S.C. Section 119(e) of British Patent Application number GB 1610819.3 filed 21 June 2016, both of which are incorporated by reference in their entireties. The International Application was published on 28 Dec. 2017, as International Publication No. WO 2017/221001 A1.

FIELD

The present invention relates to an apparatus and a method for monitoring one or more parameters of an article. More particularly the invention relates to a monitoring system and method wherein a sensor allows measurements of parameters to which the sensor is exposed, and outputs or transmits the measurements in a convenient manner, and in an energy efficient manner, to a remote location.

BACKGROUND

A number of mechanical devices are known, incorporated into fasteners, to allow inspection of the fasteners to ensure that they are appropriately tightened. The arrangements typically require a user to visually inspect each fastener as the mechanical devices provide a visible indication in the event that the fastener is not correctly fitted or tightened. Depending upon the application in which the fastener is used, such inspection may not be practical, or may only be undertaken periodically, and so the presence of a fault requiring maintenance work to be undertaken cannot be scheduled in a convenient manner. Other arrangements are known in which loosening of a fastener is detected and an output is sent to a remote location. Whilst such arrangements may allow rapid detection of faults and scheduling of maintenance, they are generally very complex and expensive, and have relatively high power consumption levels, requiring a permanent power supply or regular changing of batteries or the like, or charging of rechargeable batteries. As a result, they may be unsuitable for use in a number of applications, for example in which the provision of a permanent power supply or replacement of the batteries is impractical or undesirable.

Known systems are additionally hard to configure, and often require frequent adjustment or calibration. The cost of ongoing maintenance etc. extends beyond the cost of a sensor if access to restricted areas is required. Railway assets are one such example.

INVENTION

There are a number of applications in which a parameter is required to be measured, periodically, or in which it would be desirable to allow measurement of a parameter value, and in which information regarding the parameter value is to be output, for example for analysis at a remote and/or local location.

By way of example, if measurement values can be output in a convenient manner, the measurement values may be used in determining whether maintenance work needs to be carried out, and can be used in the scheduling of such maintenance work. In this manner, it may be possible for a proportion of the maintenance work to be undertaken at a relatively convenient time. Undertaking maintenance work in a planned preventative manner using this information, before a critical failure has occurred, may be more cost efficient than undertaking maintenance in response to the detection of a critical failure.

Further, measurement values may be used in determining the real-time values during, for example, testing, evaluation or calibration. Where a fastener such as a nut and bolt is used to secure two or more components together there is sometimes a requirement for the clamping force, provided by the fastener, to be monitored in order to allow a user to ascertain that the fastener is still correctly fitted and applying the desired clamp force. To be clear, measurement values can be read, sampled or recorded during installation.

SUMMARY OF INVENTION

It is an object of the invention to provide a monitoring system in which at least some of the disadvantages associated with known sensor devices are overcome or are of reduced impact. Several aspects are described herein and the features of different aspects can be interchangeable in light of the teaching and content of the invention.

The present invention is defined in the attached independent claim(s), to which reference should now be made. Further, preferred features may be found in the sub-claims appended thereto.

According to one aspect the invention resides in a sensor unit for measuring and monitoring a plurality of parameters associated with an asset or equipment having a fixing connected thereto, said sensor unit having: a housing having a portion for receiving a fixing therethrough; sensors arranged to measure and/or monitor (i) parameters associated with a fixing that is secured to the asset via housing and/or (ii) parameters influencing the performance of the asset; a processor configured to process data from the sensors; and a communicator adapted to transmit said data to a remote device.

The asset can typically be an object, such as a rail or motor casing, that is fixed, using a fixing such as a bolt. The asset can encompass the object and fixing. The core function can be the sensing of the status of the fixing, to be sure that the object, or an item attached to the object, is securely fixed.

The processor and communicator can be located in the housing. A portion of the housing can function as the clamping region. The clamping region can be tubular, in part. The clamping region can be fork-shaped. The fork shape can have two protruding arms for extending past a fixing.

The unit can have bi-directional communications.

The asset can be an article such as a railway line fixing, or a motor casing that is fixed to a building or structure.

The housing can have a tubular portion for receiving a fixing therethrough. The tube can be any one of triangular or square in cross-section.

At least one of the sensors can measure parameters associated with a fixing and can be configured to measure the clamp force between the fastener and the asset. At least one of the sensors measuring parameters associated with a fixing can be an inductive sensor.

The inductive sensor can measure the displacement or force applied to a fixing against the asset to which it is fixed. Said fixing can be biased against a resilient member located in the housing. The member can be an elastic component such as a spring washer. The member can be a Belleville washer.

The housing and sensor can be adapted to receive a fixing attached to an asset, said fixing receivable by the sensor, wherein the sensor has a protrusion displaceable by said fixing towards or through a sensor against a resilient member therebetween, the displacement of the protrusion being proportional to the force applied to the sensor unit. The protrusion can be a piston or other such displaceable interface.

The housing and sensor can be adapted to receive a fixing attached to an asset, said fixing receivable by a piston of the sensor that extends through an inductive loop, the position of the piston in relation to the loop being readable such that the processor can calculate the force applied to the sensor unit, the displacement of the piston towards the loop being regulated by a sprung washer. The sprung washer can be a Belleville washer.

The axis defined by the tube can extend perpendicularly from the surface upon which the sensor unit is mounted.

The sensor unit can be configured to communicate with a monitoring system having a reader for receiving data associated with measured parameters, the sensor unit configurable to operate in at least one of a plurality of modes including: a first mode, in which the sensor unit samples one or more parameters periodically at a first sample rate, a second mode, in which the sensor unit detects the occurrence of an event, and a third mode, in which the sensor unit monitors one or more parameters periodically at a second sample rate, which second sample rate is greater than the first sample rate, and wherein the data obtained in said modes is communicable with the system and/or the reader.

The sensor unit can operate in a mode including at least one of: sampling sensors periodically; sampling of one or more sensors in response to a trigger; and sampling of one or more sensors upon external stimulus, such as user interaction.

The unit can be configurable to sample, or measure and communicate data to a remote device to enable measurements to be calculated, in real-time.

The unit can be adapted to measure: the clamp force between the fastener and the asset; and at least one of acceleration, inclination, pressure, shock, temperature, magnetic field strength, battery capacity/charge, identification number, wireless quality of service/signal strength, battery capacity or level, displacement and the levels of hydrocarbon gases present around the sensor unit.

The unit can communicate with to a remote device via at least one of a near-field communications module, a wake-on-radio module, a far-field communications module, a wired communications unit and a wireless communications unit. The unit can be configured to communicate with one or more other sensor units, configure one or more sensor units, store, process, relay and/or display data from one or more sensor units, act as an intermediary between one or more sensor units and function as an interface unit with other sensor units. The unit can be adapted for two-way communications. The or each sensor can be calibrated from a remote device.

The sensor unit can measure and monitor the clamping force of a fixing, acceleration forces experienced by the fixing and the temperature at the fixing.

In another aspect the invention resides in a system for measuring and monitoring a plurality of parameters associated with a plurality of assets having a sensor unit, as claimed, fixed to said assets with a fixing.

In another aspect the invention resides in a method of measuring and monitoring a plurality of parameters associated with an asset or equipment having a fixing connected thereto, said method including: installing a sensor unit as claimed, or configuring system as claimed, and measuring and/or monitoring (i) parameters associated with a fixing that is secured to the asset via housing and/or (ii) parameters influencing the performance of the asset; processing the data from the sensors; and communicating said data to a remote device.

In another aspect the invention resides in a computer readable storage medium comprising computer-executable instructions which, when executed, configure a processor to perform the method as claimed.

Overall the sensor unit can measure the status of a fixing and determine the condition of the fixing in light of measured parameters such as acceleration forces, shocks, vibrations, impacts and displacement (LVDT). This not only enables a loose fixing to be detected but the root cause can be determined or even anticipated. Measurements can enable the detection of flaws in the vicinity of the sensor when, for example, it is applied to a dynamic mount such as a railway line or point. Voids between tracks can be detected. Faults, or wear and tear, can be detected at switches and crossings such that the health of a switch or crossing or point can be evaluated from the measurements taken from an adjacent sensor unit.

According to another aspect of the present invention, there is provided a monitoring system for monitoring one or more conditions of an article, the system comprising at least one sensor unit and a reader apparatus, the sensor unit being arranged in use to sense one or more parameters of, or related to the article, wherein the system is able to operate in a plurality of modes including: a first mode, in which the sensor unit samples one or more parameters periodically at a first sample rate, a second mode in which the sensor unit detects the occurrence of an event, and a third mode, in which the sensor unit monitors one or more parameters periodically at a second sample rate, which second sample rate is greater than the first sample rate, and wherein the sensor unit is arranged in use to communicate with the reader apparatus to send to the reader apparatus, data obtained in the first, second or third modes. Sampling can be carried out in real-time. In the third mode the sample rate may substantially comprise real time sampling.

The system can work in any one of said modes and is not limited to working in all of said modes or all of said modes simultaneously. To be clear, the system can: sample one or more sensors periodically; sample one or more sensors upon triggering of the sensor; or sample one or more sensors in response to an external stimulus, such as a user interaction.

After measurements are processed they can be transmitted as data to another sensor unit in the system, a relay station, a portable electronic device for reading the data or a remote server.

Data can be read by a reader. Data from the system can be read, reviewed and analysed by any one of a relay station, a portable electronic device for reading the data or a remote server. The portable electronic device can be a computer tablet or mobile communication device, such as a mobile phone.

Data can be sent only to a remote server and data retrieved from said server for reading, reviewing and analyzing said data. In other words all data can be sent to cloud-storage and accessed therefrom for subsequent processing.

The sensor unit may include one or more sensor devices including, but not limited to, devices for sensing one or more of: clamp force, acceleration, inclination, pressure, shock, temperature, magnetic field strength, battery capacity/charge, identification number, and wireless quality of service/signal strength.

The reader device may comprise one or more of: a processor, a memory, a near-field communications module, a wake-on-radio module, a far-field communications module, a wired communications unit, a wireless communications unit, a thermometer, an inclinometer, and an accelerometer.

The reader device can be arranged in use to do one or more of, but not limited to: receive data from one or more sensor units, configure one or more sensor units, store, process, relay and/or display data from one or more sensor units, act as an intermediary between one or more sensor units and an interface unit. The reader device may be portable and may comprise a power supply. The reader device may be user-configurable and may be re-configurable. The first reader device may include an interface unit for a human operative. The interface unit may be integral with the first reader device or may comprise a separate unit.

The reader device may be arranged in use to be left in the field to gather data. The reader device may be pre-configured to operate in a pre-determined manner.

The sensor unit and the reader apparatus may be arranged for two-way communication. The reader apparatus can be arranged to calibrate the sensor unit.

The sensor unit includes a processor. The sensor unit may include one or more antennae. The sensor unit may include a near field (NF) communications unit. The sensor unit may include a far field (FF) communications unit. The sensor unit may include a low-power wireless communication device, such as a Bluetooth™ communication module. The sensor unit may include a cable connection to the reader apparatus. The sensor unit may include a memory for storing sampled data.

According to another aspect of the present invention, there is provided a method of monitoring one or more conditions of an article, the method comprising sensing one or more parameters of the article using a sensor unit capable of operating in one or more of: a first mode, in which the sensor unit samples one or more parameters periodically at a first sample rate, a second mode in which the sensor unit detects the occurrence of an event, and a third mode, in which the sensor unit monitors one or more parameters periodically at a second sample rate, which second sample rate is greater than the first sample rate, and communicating data obtained in the first, second or third modes to a reader apparatus. The method may comprise substantially real-time sampling in the third mode.

The method can work in any one of said modes and is not limited to working in all of said modes or all of said modes simultaneously. To be clear, the system can: sample one or more sensors periodically; sample one or more sensors upon triggering of the sensor; or sample one or more sensors in response to an external stimulus, such as a user interaction.

The method may comprise sensing the, or each, parameter using one or more sensor devices including, but not limited to devices for sensing one or more of: clamp force, acceleration, inclination, pressure, shock, temperature, magnetic field strength, battery capacity/charge, identification number, wireless quality of service/signal strength. The method may include reading data from the sensor unit using a reader apparatus comprising at least first and second reader devices. The first reader device may be according to any statement herein. The first reader device may be arranged to operate in accordance with any statement herein. The second reader device may be according to any statement herein. The second reader device may be arranged to operate in accordance with any statement herein. The sensor unit and the reader apparatus may be arranged for two-way communication. The method may comprise calibrating the sensor unit using the reader apparatus. The method may include storing sampled data in a memory unit of the sensor unit. The invention also comprises a program for causing a device to perform a method of monitoring one or more conditions of an article, the method being according to any statement herein. In a further aspect, the invention provides a computer program product on a computer readable medium, comprising instructions that, when executed by a computer, cause the computer to perform a method of monitoring one or more conditions of an article, the method being according to any statement herein.

According to a further aspect of the present invention there is provided a sensor device comprising a sealed sensor housing in which a sensor sensitive to a parameter to be measured is located, the sensor housing further housing a far field wireless communications transmitter whereby an output from the sensor can be transmitted, wirelessly, to a remote location, the sensor housing including a clamping region adapted to cooperate with an associated fastener to secure the housing in a desired position.

The far field wireless communications transmitter may form part of a transceiver and so also be capable of receiving signals By way of example, the clamping region may take the form of a part of the housing in which an opening is formed and through which part of a fastener such as a threaded bolt may extend, the threaded bolt applying, in use, a clamping force to the clamping region to secure the housing in position. In such an arrangement the device takes substantially the form of a washer that may be described as a smart washer by virtue of the functionality associated therewith. Alternatively, the clamping region may define a pair of spaced fingers adapted to receive, therebetween, part of a threaded bolt or other fastener to allow the bolt or fastener to apply a clamping force to the spaced fingers thereby clamping the housing in position.

The sensor may take a range of forms and be adapted to measure a range of parameters. In one preferred arrangement the sensor may be adapted to output a signal indicative of the magnitude of the clamping force applied by the fastener. In addition, or alternatively, the sensor may be sensitive to one or more other parameters. By way of example, it may be sensitive to the level of vibrations to which the sensor device is exposed, to tilting of the sensor, to the presence of various gases, to the presence of water indicating that the sensor device has become submerged and/or to a number of other parameters.

The sensor device may include an internal power supply, for example in the form of a battery such as a rechargeable battery. Alternatively, or additionally, it may include electrical generation means. Where both a rechargeable battery and an electrical generation means are present, if desired the electrical generation means may be adapted to charge the battery. Where an electrical generation means is provided, it conveniently takes the form of an arrangement that uses vibrations to which the sensor device is exposed to generate an electrical output. Alternatively, for example, an array of photovoltaic cells may be integrated into the sealed housing.

The sensor unit can be powered by one or more of the following: mains power, battery primary cell, rechargeable battery, wherein battery recharging may come in the form of; energy harvesting (e.g. vibration, photovoltaic, heat), inductively coupled energy or a hardwired connection. The sensor unit may not be permanently powered and can be connected to a temporary power source to obtain sensor data.

In a further alternative, the housing may include an inductive loop arranged to generate an output in response to the presence of a powered inductive loop within a predetermined range thereof. It will be appreciated that such an arrangement may be used to power the sensor device and/or charge a rechargeable battery or the like thereof. The powered inductive loop may form part of a portable handset for use with the sensor device. The inductive loop of the sensor device and the powered inductive loop may additionally serve as a near field transmission arrangement whereby control signals can be transmitted to the sensor device.

The wireless communications transmitter or transceiver conveniently comprises a far field radio transmitter or transceiver. The transmitter or transceiver is preferably adapted to transmit signals for reception at an access point located at a remote location from the sensor device.

By way of example, the access point may be located at a distance in the region of 50 m from the sensor device. The access point may be arranged to receive signals from a plurality of sensor devices. If desired, the access point may transmit the received data to a central data processing facility where data received from other access points is also received and processed. The manner in which the data is transmitted to the central processing facility may take a range of known forms, including both wired and wireless transmission techniques.

Where a portable handset is provided, for example as described above, it may include a wireless communications receiver adapted to receive the signals transmitted from the sensor device and/or signals transmitted thereto from the access point to provide information to a user and/or for subsequent use in controlling the operation of the sensor device.

An arrangement of this type may operate in a range of modes. By way of example, the sensor device may be adapted to output signals to the access point at substantially fixed intervals. In a second operating mode, the sensor device may be operable to output signals to the access point when the sensed parameter value falls outside of a predetermined range. In a third mode, the sensor device may be arranged to stream the sensor output to the access point/handset. This mode may be used, by way of example, in conjunction with a handset of the type outlined hereinbefore to provide power to the sensor device, the streamed data being useful to a user as he tightens the fastener to ensure that the clamping force applied by the fastener is at a desired level. Of course, combinations of these operating modes may also be used, when desired.

Where a plurality of sensor devices are provided, one or more of the sensor devices may further include a receiver, the sensor device being operable to receive a signal transmitted by another of the sensor devices and to transmit both the received signal and information relating to the output of the sensor thereof for reception at a remote location. A single signal including both the received signal and the additional information from the sensor may be transmitted. Alternatively, two separate transmissions may be output. It will be appreciated that in such an arrangement each transmitter need only be capable of transmitting a signal to the location of the next of the sensor devices. Accordingly, the power requirements of each of the wireless communications devices may be significantly reduced whilst still permitting data to be transmitted over long distances.

A plurality of sensor units can form a self-healing mesh network. Or other such communication network for reliable and efficient transmission of data.

The invention may include any combination of the features or limitations referred to herein, except such a combination of features as are mutually exclusive, or mutually inconsistent.

These and other aspects of the present invention will be apparent from and elucidated with reference to, the embodiments described herein. Embodiments of the present invention will now be described, by way of example only, and with reference to the accompany drawings, in which.

Figure 1:
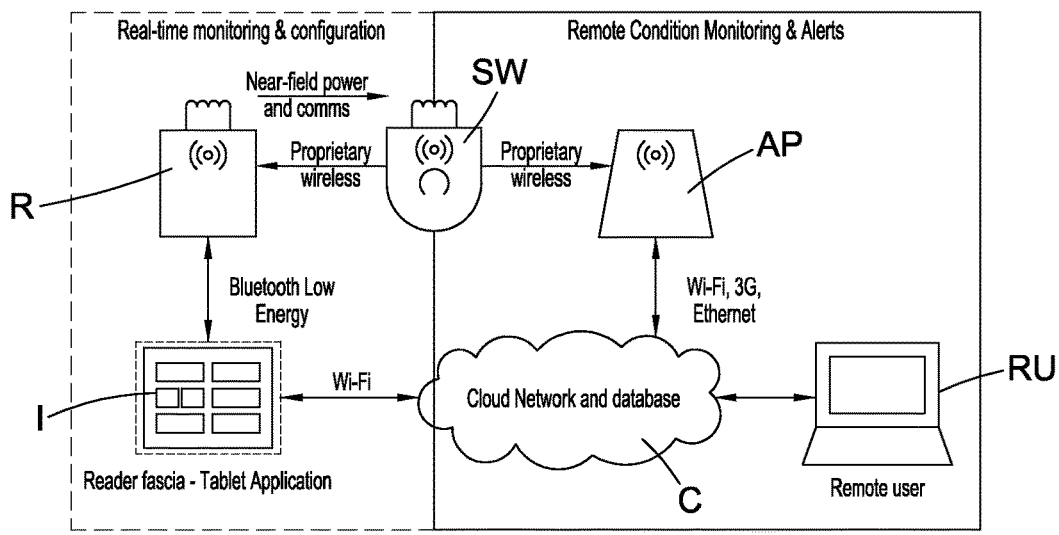
FIG. 1 is a schematic overview of a monitoring system in accordance with embodiments of the present invention.

Embodiments of the invention utilise what may be referred to as "smart sensors" of one kind or another. In the example that follows, the sensor is a "smart washer" or "sensor unit".

A smart-washer is a self-contained and sealed multi-sensor electronic instrument that provides the means to self-power and to wirelessly communicate data sampled from an embedded sensor device in a controlled and reconfigurable manner, under the control of an embedded microcontroller, to a reader apparatus.

The smart washer is designed to be reconfigurable so as to optimise the sample rate of sensor devices (as dictated by the parameter of interest) and prolong the operational lifetime (power utilisation) over which these samples are taken.

The washer has been designed primarily to measure the clamp-force of threaded fastenings, such as nuts, bolts and screws; and in so doing can tell the user whether a bolted joint is loose or correctly fastened. However, washers according to embodiments of the present invention have optionally been augmented with additional sensor devices to report other signals that relate to the health of the asset to which the washer is fastened, and also the health of the washer itself. The suite of optional sensor devices includes, but is not limited to, clamp-force, acceleration, inclination, shock, real-time-clock, battery fuel gauge, wake-on-radio.

One mode of use is the "remote condition monitoring mode". In this mode the washer is left in the field and is usually remote from the human user. Here the washer is configured to sample a sensor(s) at set periods or time, by virtue of an embedded real-time clock; the period is usually greater than 10 seconds. As such the washer transmits a packet of data containing the sample value or a processed version of it or some other result determined from it, wirelessly to a reader apparatus. The system may be configured to provide acknowledgements.

In addition to periodic transmissions, the system can be configured to transmit a data packet asynchronously as a result of a parametric exception (such as a conformal change in clamp-force) or an interrupt signal such as a change in inclination, shock or even a change in configuration. This mode of use is referred to as "exception mode".

In remote condition monitoring mode, the purpose of the reader apparatus is to accept the message transmissions from the washer(s), acknowledge receipt of the messages (optional) and relay them either as they are, or else in some other processed form to the user. As such, the reader apparatus is connectable to a wider network using standard wired or wireless communications.

The information (data, notifications and alerts) collected from the washers via the reader apparatuses as described allows the condition of the target asset, and of the components used to collect the data, to be monitored remotely. All washers and reader apparatuses have unique identification numbers that allow all system components and their location on any asset to be recorded.

As stated, one example of the sensed parameter is clamp-force. In addition to the infrequent (yet periodic) use in the remote condition monitoring mode described above, the embedded sensors can be used in a "real-time mode" of operation. As an example, sampling the clamp-force ten times per second allows the application of the clamp force, as applied by a torque wrench or spanner, to be observed. In this instance the target washer needs to be reconfigured to sample and transmit data at the appropriate rate. The reader apparatus, together with a user interface unit, e.g. in the form of a tablet (computer) is used to achieve this.

The reader apparatus in this instance acts as a fascia-less instrument that can connect to the tablet by wires, or optionally wirelessly. The latter arrangement allows the user to retreat to a safe distance. This can be an important benefit, as often washers are connected to machines, or sited in processes, and positioning of the reader apparatus facilitates safe distance operation.

Technically it is possible for a washer to "talk" to a tablet, or computer, directly. However the wireless systems and protocols normally present in such devices are often incompatible with the operational protocols needed by the washer to provide configurability and efficient power utilisation. For example, Bluetooth Low Energy is data limited, Wi-Fi is too power-hungry and 2.45 GHz carrier frequency is too crowded.

In real-time mode, a number of target washer(s) may be configured to talk to a specific reader, resulting in a so-called "star network". This enables the application of clamp force to an asset, such as a flange, to be observed in real-time and allows e.g. the application of force, as a result of a stud tightening pattern, to be observed. The data observations may be shown in a variety of forms including graphs that may be stacked or superimposed. Data can be stored to local or remote memory etc.

FIG. 1 is a schematic overview of a monitoring system according to an embodiment of the present invention. The system comprises a sensor device in the form of a smart washer SW, a first reader R, a second reader AP, an interface I, a cloud C and a remote user RU. The sensor device SW senses a parameter or condition of an asset (not shown) and wirelessly communicates data to the first reader, when operating in a real-time monitoring mode or during configuration of the sensor. A user in the local vicinity is able to communicate with the reader, and hence the sensor, using the interface.

In a remote monitoring mode, or in the event of an exception, the sensor communicates wirelessly with the second reader, sometimes referred to as an access point. A remote user can access the interface and/or the second reader/access point via the cloud network.

Referring firstly to FIGS. 2 to 5, in accordance with one embodiment of the invention a sensor device, in the form of a smart washer, is shown generally at 100. The sensor device 100 comprises a housing 112 within which is located a sensor 114 and a far field wireless communications transmitter device.

Conveniently, the transmitter device forms part of a transceiver device 116, and will be described as such hereinafter. However, it will be understood that in some embodiments, it may comprise only a transmitter. The housing 112 includes a clamping region 118 whereby the housing 112 can be secured, in use, in a desired position, for example to a device to be monitored. The housing 112 is hermetically sealed, providing protection for the sensor 114, resulting in the device 100 being suitable for use in a wide range of applications under a range of environmental conditions and in a range of positions, operating reliably for extended periods of time. The housing 112 does not include any sockets or the like which, if present, could allow water ingress, and does not have any protruding wires or cables which, if present, would need to pass through the housing 112, risking water ingress. No electrical connections are made between components located within the housing 112 and components external thereto. A hardwire connection can be provided to the sensor unit. The sensor unit can have a replaceable battery.

Figure 2:
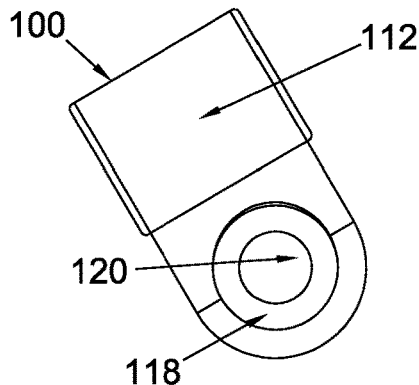
FIG. 2 is a perspective view illustrating a sensor device in accordance with one embodiment of the invention.
Figure 3:
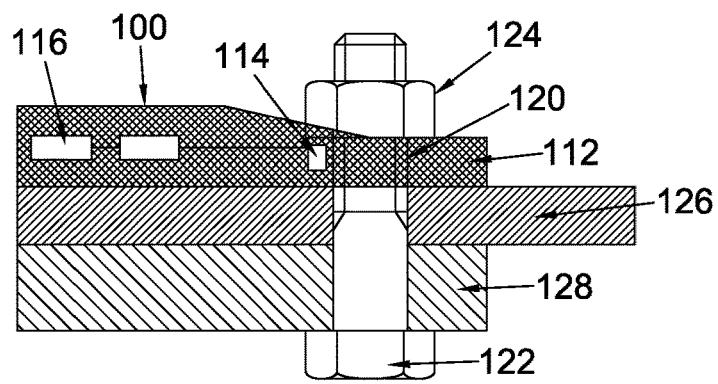
FIG. 3 is a diagrammatic view illustrating the sensor device in use.

In the arrangement illustrated, the clamping region 118 is of generally planar form and includes an annular opening 120 of diameter sufficiently large to allow the shaft of a bolt 122 to extend through the opening 120 in the manner of a washer. Where the bolt 122 is used, in conjunction with an associated nut 124, to secure together first and second components 126, 128, as shown in FIG. 2, it will be appreciated that the housing 112 is firmly clamped to the components 126, 128 by the nut 124 and bolt 122. Accordingly, if the first and second components 126, 128 are subject to movement or vibrations, then the housing 112 will be subject to substantially the same movement or vibrations.

In the arrangement illustrated, the sensor 114 is adapted to monitor the clamping force applied to the clamping region 118. However this need not be the case and other parameters may be monitored if desired, for example as mentioned below.

Figure 4:
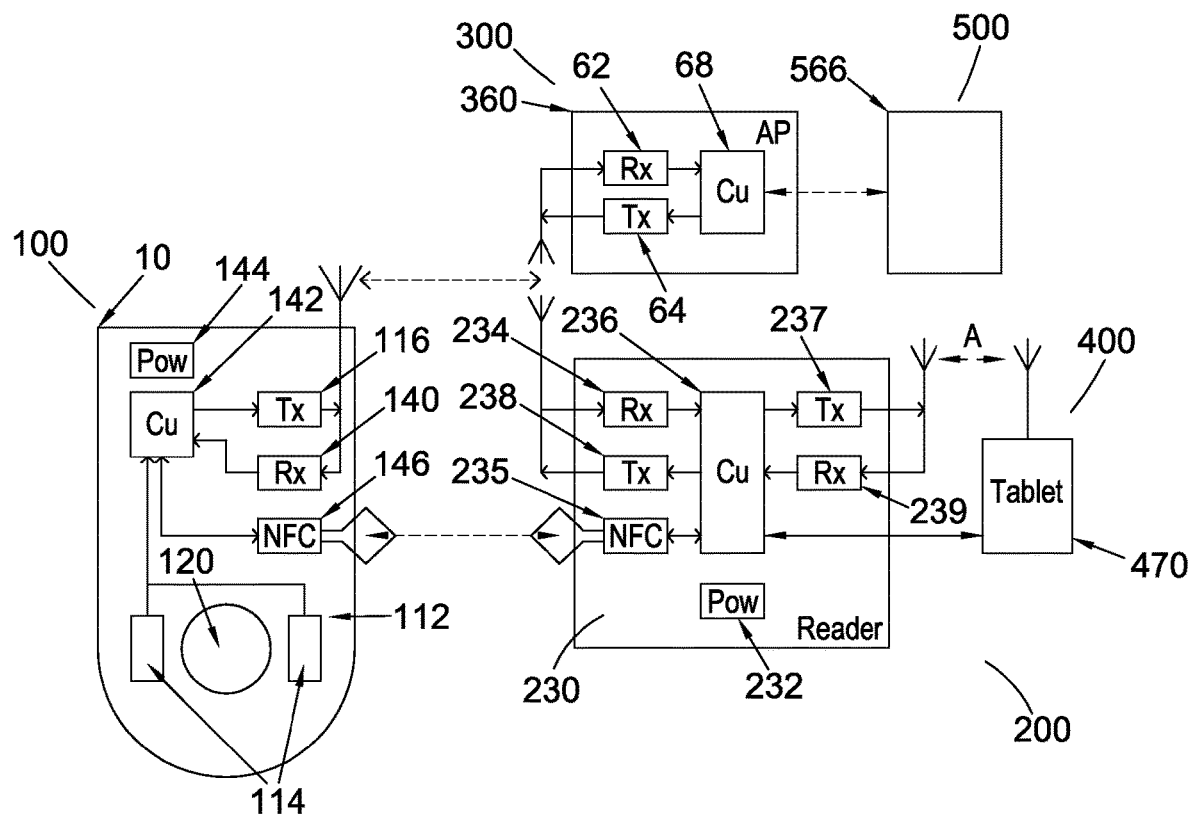
FIGS. 4 and 5 are further diagrams illustrating the operation of the sensor device.

FIG. 4 shows the sensor device 100, first reader 200, a second reader/access point 300 an interface 400 and a remote user represented at 500.

The sensor device 100 includes: a control unit 142, a power supply 144, a transmitter 116, a receiver 140, a near field communications unit 146 and sensors 114.

The first reader 200 includes: a control unit 236, a first receiver 234, a first transmitter 238, a near field communications unit 235, a second transmitter 237, a second receiver 239, a power supply 232 and antennae A.

An interface unit 300 in this example comprises a tablet computer 370.

The second reader 400 includes: a control unit 468, a receiver 462 and a transmitter 464.

As shown in FIG. 4, the sensor device 100 is adapted to be used in conjunction with a first reader 200, in the form of a handheld receiver unit or handset 230, powered by an internal power supply 232. A wireless receiver device 234 outputs to a control unit 236. The far field wireless receiver device 234 conveniently forms part of an appropriately configured transceiver device. The power supply 232 further supplies an inductive near field transmitter unit 238. The power supply 232 may take the form of, for example, a rechargeable battery arranged to be charged when the handset 230 is near a suitable power source, or is connected to a mains socket. The manner in which the battery is recharged may be a wireless arrangement, but is more preferably to be charged from a mains supply, whereas the power supply of the sensor device 100 is charged wirelessly, for example from a near field charger. If desired, the handset 230 may carry a range of sensor devices and/or other peripherals powered therefrom.

In use, when the antenna of the NFC 235 of the handset 230, is in close proximity to the antenna of the NFC 146 of the sensor device 100, for example at a distance of around 10 mm, the handset NFC 235 will inductively couple with the sensor NFC 146 located within the sensor device 100 which in turn is connected to a control unit 142. In so doing, the NFC coupling of the handset 230 to the sensor 100 may be used to power the sensor 100. It may alternatively or additionally be used to charge the rechargeable battery 144 or similar within the sensor 10. In addition, the NFC coupling may permit signals to be transmitted from the handset 230 to the device 100, for example to control and configure the manner in which the sensor 100 operates. The NFC communications link, in this embodiment, is a one-way communications link, the primary purpose of which is to initiate and allow a secure two-way far-field communication between the handset 230 and the sensor 100. However, it will be appreciated that arrangements are possible in which two-way NFC communications can be established, permitting signals to be transmitted from the sensor 100 to the handset 230, allowing measurement or acknowledgement data to be received by the handset 230. In so doing a two-way near field communications link between the handset 230 and the sensor 100 is formed, that may be preferred in some instances.

The further transmitter 237 and receiver 239 are provided for communication with a user interface 400. This typically comprises a tablet computer 470, and in use is connected by cable or else wirelessly to the reader handset 230 to configure the latter and/or receive data from it, as will be described later.

The signals transmitted by the far field radio transceiver 116 are receivable by a second reader 300 in the form of a remote access point 360 located, for example, at a distance of up to 50 m away from the device 100. The access point 360 includes a receiver device 362 whereby the signals are received, and also a transmitter device 364, the devices 362, 364 conveniently forming a transceiver, whereby signals can be transmitted to the handset 230 and/or to the sensor device 100 as an acknowledgement signal. Accordingly, if desired, all signals received by the access point 360 may be acknowledged by the transmission of an acknowledgement signal received by the sensor device 100 and/or the handset 230. If no acknowledgement is received, then the failed transmission may be logged and data retransmitted subsequently if required. The access point 360 is preferably configured to receive signals from a number of devices 100 located within far field range thereof as described below. The signals may also be received by the receiver device 234 of the handset 230.

To ensure data and control integrity, the near field inductive coupling by which control signals are transmitted to the device 100 is preferably a proprietary arrangement. Furthermore, the device 100 is preferably arranged to transmit an acknowledgement via the far field transceiver device 116 upon receipt, and/or actioning, of a control signal. Consequently, the reception and processing of control signals can be confirmed, and if an unauthorised control signal is received and processed by the device 100, reception of the acknowledgement signal will provide an indication that remedial action is required in order to maintain correct operation of the device 100.

In use, with the sensor device 100 powered using the inductive coupling or from an internal battery, the control unit 142 and sensor 114 are operable to output to the wireless transceiver device 116 a signal indicative of the output of the sensor 114, and hence indicative of the clamping force applied by the bolt 122 and nut 124 to the clamping region 118 or other parameters to which the sensor 114 is sensitive, for onward transmission by the wireless transceiver device 116 for reception both by the receiver device 234 of the handset 230 and by the receiver 362 of the access point 360. If desired, the signal received by the handset 230 may be processed on board the handset 230 and information output therefrom to a user. Alternatively, or additionally, the processing may be undertaken at the access point 360 or at a remote processing centre 566 with which the access point 360 is in communication. Preferably, in addition to transmitting the data representative of the sensor output, an identification signal representative of the identity of the sensor device 100 is also transmitted, thereby ensuring that the access point 360 knows from which sensor device 100 the signal has been received.

Whilst as described hereinbefore, an identification signal is preferably transmitted, the unit 230 may further include a GPS device so that the location of the unit 230 at the time that a signal is received may be recorded and used as a further identification of the sensor device 100 from which the signal has been received.

If desired, the device 100 may incorporate a memory and the control unit 142 may be programmed in such a manner as to allow the device 100 to operate as a data logger, periodically logging the output of the sensor 114 but only transmitting data via the far field transceiver device 116 when required depending upon the operating mode in which the device 100 is being used as described below.

Figure 5:
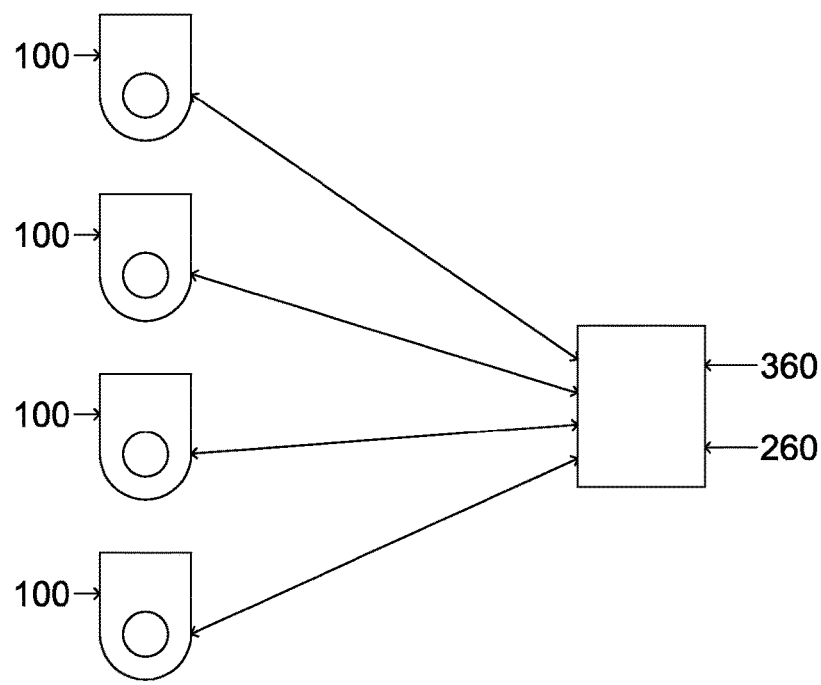

As shown in FIG. 5, a plurality of sensor devices 100 are each adapted to communicate with the access point 360. The access point 360 may, in turn, be adapted to communicate with a remote processing station 566 at which signals received from a plurality of access points 360 are processed. It is envisaged that each sensor unit 100 will be spaced from the associated access point 360 by a distance of up to about 50 m as mentioned hereinbefore.

In the arrangement described hereinbefore, several different operating modes are envisaged. In one operating mode, each sensor device 100 may be arranged to output a signal at predetermined intervals, for example, at six hourly intervals. It will be appreciated that between the transmissions, very few functions of the sensor device need to be active, and so power consumption can be limited to, primarily, the periods during which measurements are taken and signals output to the access point 360. Between transmissions, data logging may take place as mentioned hereinbefore in some arrangements. In an alternative operating mode, the sensor devices 100 may be arranged to take measurements periodically and to output signals to the access point 360 only in the event that the measurements derived from the sensor 114 fall outside of a predetermined range. This may allow power savings to be made, but results in less information being available at the access point 360 or processing station 566 which may impede the detection of the onset of a fault.

In both of these operating modes, the power requirements of the device 100 are reasonably low and may be met using, for example a rechargeable battery located within the device 100 and periodically charged, by way of example, using the handset 230 as outlined hereinbefore. The device 100 may thus operate in either of the modes outlined above without requiring the handset 230 to be located within near field range thereof.

In an alternative operating mode, the handset 230 may be used to supply power to the device 100 via inductive coupling therebetween and may transmit a control signal to the device 100 to place the device 100 into a streaming mode in which sensor data is transmitted, via the far field transceiver device 116, substantially continuously. Such an operating mode may be of benefit, for example, where the fastener is being fitted and the user needs to know the clamping force that is currently being applied thereby to allow adjustment of the clamping force to a desired level. Once the desired clamping force has been achieved, the handset 230 may transmit a control signal to the device 100 to return it to one of the other operating modes.

Figure 6:
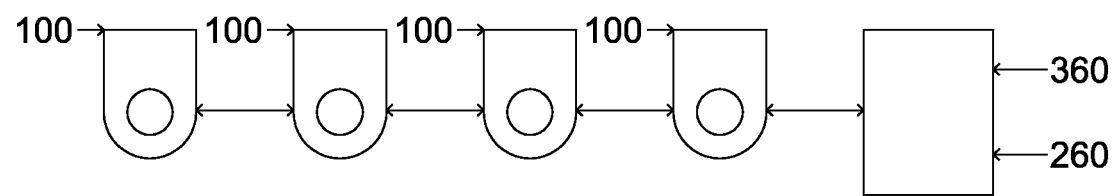
FIG. 6 is a view illustrating an alternative communications technique.

FIG. 6 illustrates an alternative communications regime which allows data transmission over large distances without requiring individual transmitters to be of great power. In the arrangement of FIG. 6, a plurality of sensor devices 100 are provided, at least some of which include both far field wireless transmitter functionality and far field receiver functionality, for example in the form of the transceiver device 116. In use, each sensor device 100 with a far field transceiver device 116 is adapted to receive a signal from another sensor device 100 in the vicinity thereof and to transmit both information relating to the received signal and information relating to the output of the sensor 114 thereof. This may take the form of two separate transmissions or alternatively a single signal including both the received information and the sensor information may be transmitted. In this manner, a number of sensor units may be daisy-chained or networked to allow data transmission over an extended distance without requiring each individual transceiver to be capable of transmitting over that distance.

Embodiments of the invention may be used in a wide range of applications, and the nature of the sensors 114 used in the devices 100 will depend, at least to some extent, upon the applications in which the devices are used. By way of example, the devices 100 could be used in applications in which it is desired to monitor the clamping force with which two or more components are clamped to one another as outlined hereinbefore. One example of this may be in railways where it is desired to monitor the clamping of components to railway tracks. In addition to monitoring clamping loads, the sensor devices 100 could monitor vibrations and the orientation of the housings 112, providing additional information that may be indicative of ground movement or the like, by incorporating appropriate sensors therein.

In another application, the devices 100 could be clamped to fixed objects such as buildings, pylons or other structures in areas in which mining, fracking or ground movement are taking place, the outputs of the sensors providing data regarding for example the impacts of the mining or fracking on ground movement and/or the magnitude of vibrations experienced as a result of such works, depending upon the form of sensor used.

Other types of sensor could be included in the sensor housing 112. By way of example, sensors sensitive to parameters such as the presence of certain gases in the environment could be provided. A further possibility is for a sensor sensitive to the resistance between a pair of electrodes to be provided, the resistance reducing in the event that the sensor is submerged in water and so being capable of being used to provide an indication of the presence of water, flooding or, if several devices are provided, as a water depth gauge.

Figure 7:
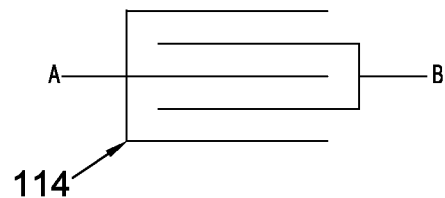
FIG. 7 is a view illustrating one form of sensor.

FIG. 7 illustrates a sensor of this type, with A and B being interleaved conductors forming a moisture sensor. The more moisture that covers the conductors, and/or the more moisture there is in the atmosphere surrounding them, the more the impedance between A and B changes. This can be useful if it is desired to notify whether, and/or to what extent, a washer was being immersed in a fluid, e.g. at a railway points flooding.

Another type of sensor that could be employed is a Hall-Effect sensor, providing an output indicative of magnetic field.

Further sensors can be added to the sensor unit, such as accelerometers and/or displacement sensors to enable detection of, for example, void detection in rails, crossing noise impact force and switch movement, which occurs when tracks switch.

In some circumstances it may be desirable for the sensor device 100 to include an additional electrical generation means, for example to charge an internal power supply. By way of example, one or more arrays of photovoltaic cells may be integrated into the sealed sensor housing 112 and operable to generate electrical power.

Figure 8:
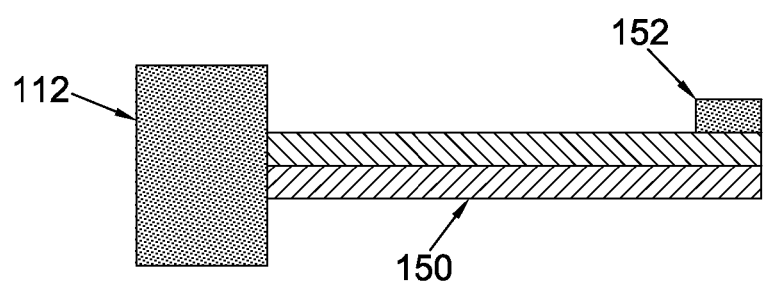
FIG. 8 is a view illustrating one form of electrical generation arrangement.

A further option is illustrated in FIG. 8 and comprises a piezoelectric element 150 having an end part rigidly secured within the housing 112 and a free end carrying a weight 152. In use, if the housing is subject to vibrations, the end of the element 150 secured to the housing 112 will also vibrate, the inertia of the weight 152 carried at the free end of the element 150 reducing movement of that end of the element 150. As a result, flexing of the element 150 will occur which gives rise to the generation of an electrical power output that can be used to charge a battery or the like. The size of the weight 152 and element 150 can be chosen relative to the magnitude of the vibrations to which the device 100 is expected to be exposed, so as to optimise the generation of electricity. The vibrations used to generate electricity may arise from, for example, the passage of trains along railway tracks, the movement of vehicles along roads, the passage of fluids along pipelines or the like.

The sensor devices 100 described hereinbefore are advantageous in that they are of relatively small dimensions, but can be of rugged form and so be suitable for use in harsh operating environments. They permit measurements to be taken and transmitted to remote locations in a simple and convenient manner, and allow this to occur without requiring complex transmission methodologies and without high electrical power requirements.

Although in the arrangement described hereinbefore the clamping region 118 takes generally the form of a washer defining an opening 120 through which a part of the fastener extends, other arrangements are possible. By way of example, the clamping region may comprise a pair of fingers spaced apart from one another and between which part of a fastener is received, in use. This represents merely one alternative, and other arrangements are possible without departing from the scope of the invention.

Figure 9:
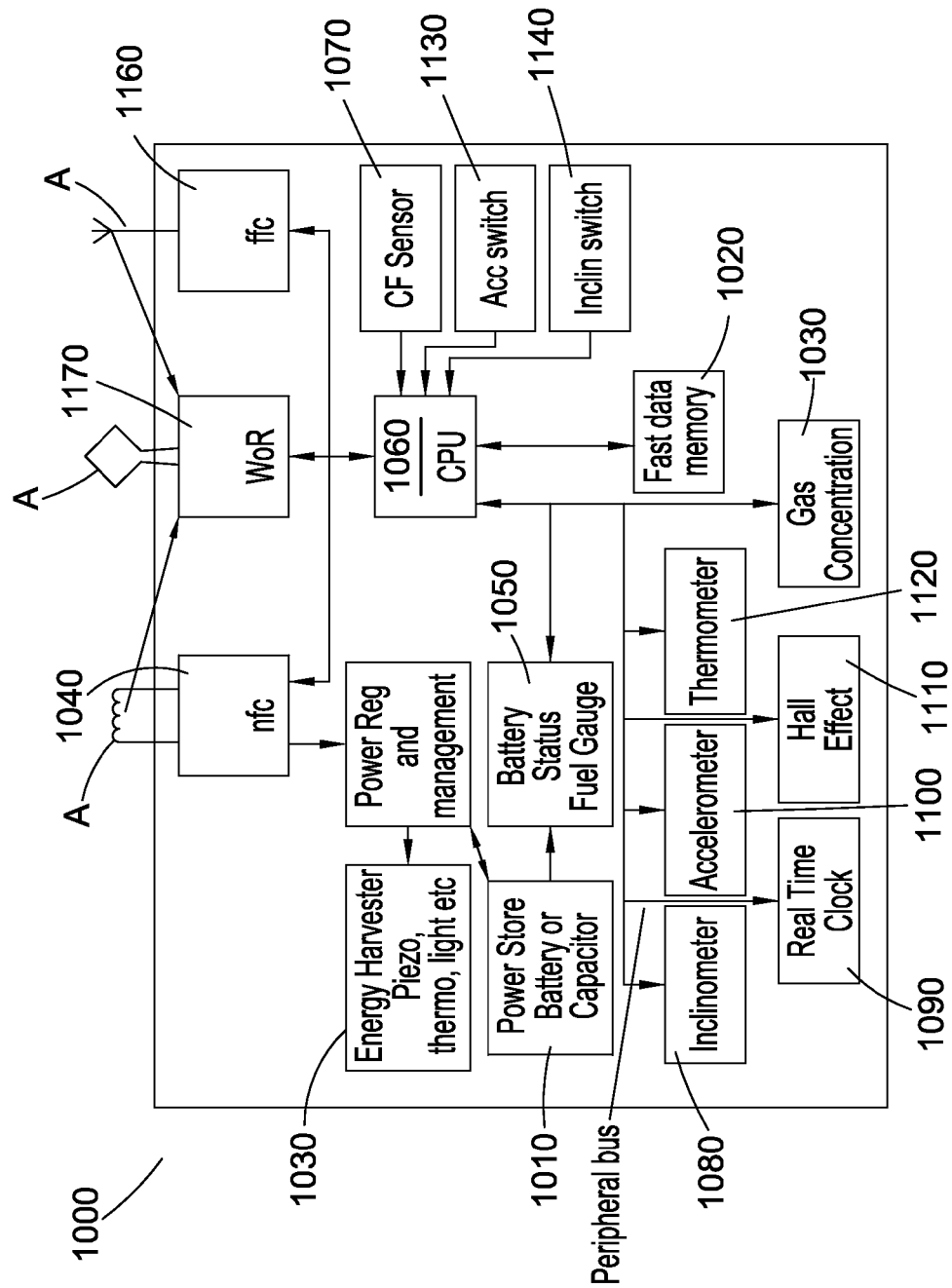
FIG. 9 shows schematically a sensor apparatus in more detail.

Turning to FIG. 9 this shows, schematically, a sensor device 1000, in more detail. The sensor device 1000 includes a power source 1010 and storage element comprising a rechargeable battery or capacitor. Power to recharge this power source can be scavenged from the environment within which the sensor finds itself or from signals that perturb the sensor, using an energy harvester 1030 such as by way of example and not limited to a vibrational energy harvester, solar cell or thermoelectric cell. Alternatively the power source may be recharged by signals provided specifically for that purpose, for example the magnetic near field communications provided by a reader handset and inductively couple to NFC communications unit 1040 shown. The nature of these power source signals requires power regulation and management in order to effectively recharge the power source. In addition the status and capacity of the power source 1010 is monitored by battery status unit 1050 and communicated from the sensor in order for the user to undertake recharging. Thus the battery status and capacity are metrics that are presented to the a CPU 1060 for onward transmission. The sensor device 1000 has embedded within it other sensors or functions that communicate with the CPU either directly or over a bus. Examples shown include, but are not limited to, a clamp-force sensor 1070, an inclination sensor 1080, a real-time clock 1090, an accelerometer 1100, a Hall-effect (magnetic field) sensor 1110, temperature sensor 1120 and a gas concentration sensor 1130. Such functions include but are not limited to, data memory, cryptographic engines, global positioning systems (GPS). In addition to sensors, the device 1000 has embedded within it switches whose operation is dependent on a signal applied to the sensor or a signal arising from the environment within which the sensor 100 resides. Such switches serve to wake the sensor 100 from a low power (dormant) state and as such act as triggers or alerts that can result in the sensor 100 carrying out a specific process(es). Examples of applied switch signals include, but are not limited to, the near-field communication and far-field wake-on-radio signals. Such signals are generated by an external means in response to a desire to have the sensor 100 conduct a specific process. Examples of environmental switch signals include, but are not limited to, inclination switch 1140, acceleration switch 1150 and shock switch (not shown). The system of FIG. 9 can additionally include a displacement sensor.

In order for the sensor 100 to interface with the world, two wireless channels are provided. The first is the near-field communications NFC channel 1040 that allows power, data and trigger signals to be input into the sensor 100, as well as allowing data to be transmitted from the sensor 100. The second channel is the far-field channel FFC 1160 that allows bidirectional data transmission wirelessly. Additionally or alternatively, a low-power wireless communicator can be provided, such as a Bluetooth connection.

The sensor 100 is also equipped with a wake-on-radio system 1170 that uses far-field or near-field transmissions to generate a binary signal, whose presence or absence wakes the sensor 100 from a dormant state. Importantly this circuit should be extremely low power or preferably consume no power (i.e. a passive) circuit. The signal for the wake-on-radio circuit can be derived from the antenna A of the NFC 1040, the NFC 1160 or a dedicated antenna.

Figure 10:
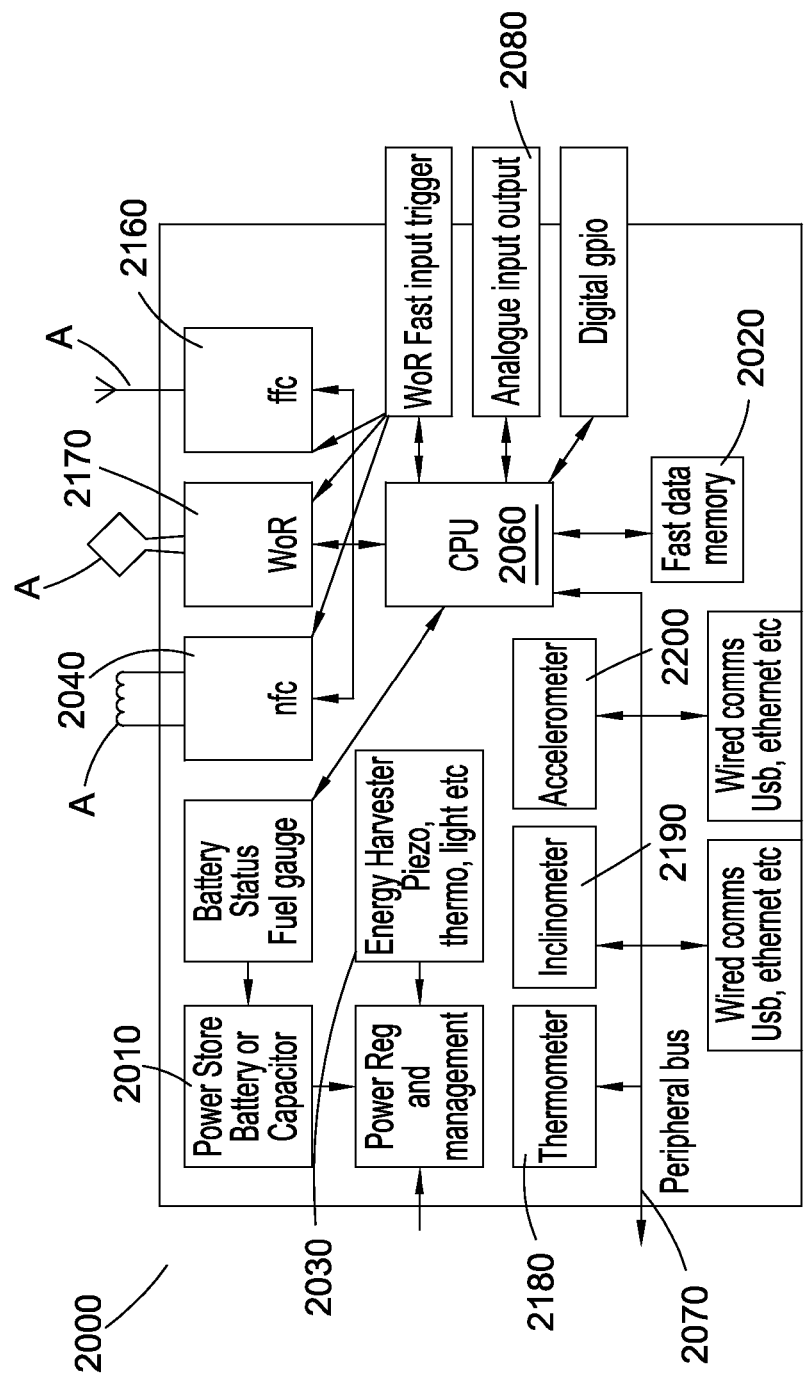
FIG. 10 shows schematically a reader apparatus in more detail.

FIG. 10 shows schematically a reader device 2000, which may be either the first (200) or second (300) reader of FIG. 4, in more detail. The reader includes a power source 2010 and storage element comprising a rechargeable battery or capacitor. Power to recharge this power source can be scavenged from the environment within which the reader finds itself or from signals that perturb the reader using an energy harvester unit 2030, such as by way of example and not limited to a vibrational energy harvester, solar cell or thermoelectric cell. Alternatively the power source may be recharged by wired means, such as, but not limited to mains power or power-over-Ethernet. The nature of these power source signals requires power regulation and management in order to effectively recharge the power source. In addition the status and capacity of the power source is monitored by a battery status unit 2050 and communicated from the reader in order for the user to undertake recharging. Thus the battery status and capacity are metrics that are presented to a CPU 2060 for onward transmission.

Embedded within the reader is the capability to interface externally with, other sensors or functions that communicate with the CPU 2060 either directly or over a bus 2070. Such sensors include but are not limited to clamp-force, inclination, real-time clock, accelerometer, Hall Effect (magnetic field) temperature, gas concentration etc. Such functions include but are not limited to, data memory, cryptographic engines, global positioning systems (GPS).

The reader has the ability to interface (input and output) with other sensors or devices using both wired and wireless means. Furthermore these interfaces may be high level communications protocols, simple digital input and output signals or analogue signals.

The reader provides digital general purpose input and output channels that allow simple on-off signals to initiate processes, for example a digital signal may trigger the sampling of an analogue channel or trigger a wireless transmission to a sensor(s) 10 or a digital output may be used to signal an event using a light emitting diode.

The reader also provides analogue input and output channels via a unit 2080. The analogue input allows the reader to sample data and either store it for use, such as a data logger, or use the sampled analogue channel to provide a trigger to initiate a processes, such as a wireless transmission to a sensor(s) 100, transmission of an alert to users, store some data etc. The analogue output may be used to generate an audible warning.

The reader has a dedicated wake-on-radio interface 2170. This interface is a fast acting interface that sends a predetermined wake-on-radio command signal as soon as it is energised. This allows a minimum latency between a triggering event reader side and the transmission of a wake-on-radio signal to initiate the sampling of data sensor side.

The reader also has a dedicated near-field channel interface 2040 that allows the reader, by virtue of its near field antenna A to communicate with the sensor 100, via the sensors near-field antenna. The near field antenna allows the reader to initiate a secure channel with a senor allowing power, data and wake-up signals to be transmitted to the sensor and allow data and acknowledgements to be received from the sensor; it can also be used as a wake-on-near-field signal The reader additionally provides a dedicated far-field channel interface 2160 that allows the reader, by virtue of its far-field antenna A to communicate bi-directionally with the sensor(s), via the sensor's far-field antenna. The far-field antenna may also be used to generate a wake-on-radio signal, to wake up sensors.

The reader also has a dedicated far-field channel interface 2160 for wake-on-radio purposes that allows the reader, by virtue of its wake-on-radio far-field antenna A to transmit to the sensor(s) so as to wake up sensors.

The reader further provides standardised wireless communications interfaces that allow the reader to communicate with a smart-phone tablet and other computer devices efficiently.

A thermometer, 2180, inclinometer 2190 and accelerometer 2200 are also provided. With respect to the inclinometer and accelerometer, as with the sensor device, they are both making parametric measurements. These measurements could be made by either the washer or the reader. In reality the inclination is derived from the acceleration. Knowing the inclination of the sensor device and the reader is useful information, as is knowing the acceleration of the sensor device. Knowing the acceleration of the reader could be useful if the reader is mounted on something that is moving.

Figure 11:
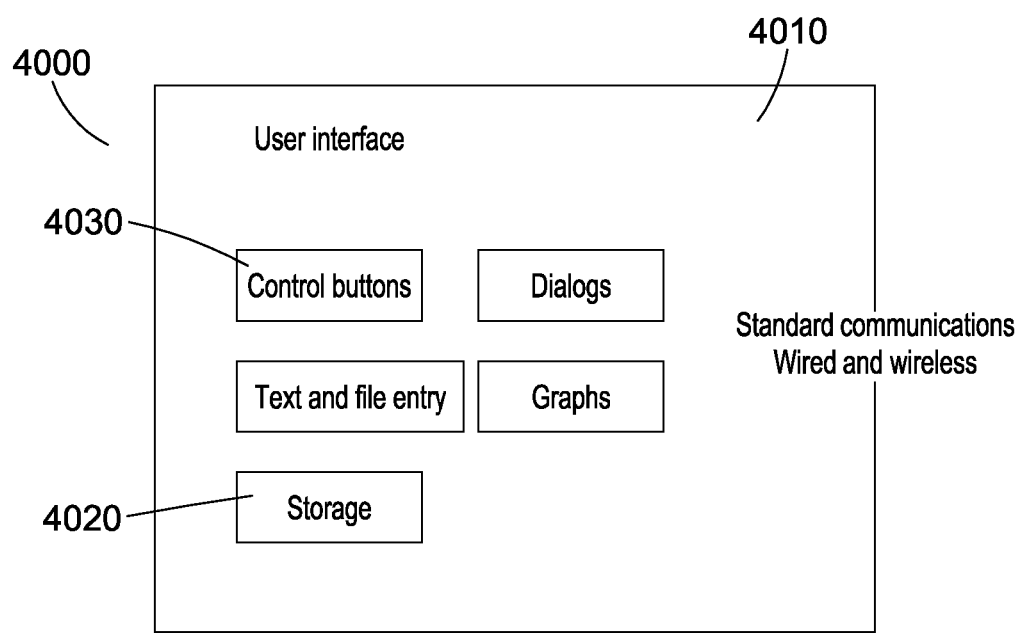
FIG. 11 shows schematically an interface apparatus in more detail.

FIG. 11 shows schematically a user interface device, generally at 4000, including the means to observe, input and store data. In use the interface is connected wirelessly or with wires to the reader device and can be used to configure it and receive data from it. In this way the interface can be adapted to suit the needs (permissions) of the users.

The interface unit 4000 may be in the form of a tablet computer, having a display 4010, a memory 4020 and control buttons 4030 and with wireless and/or wired connectivity.

When used as an interface to reader 1 (reader) for real-time monitoring in the field, the preferred communications method is wireless such as Bluetooth. This allows the user to collect data remotely from the sensor, ensuring they can be out-of-harms-way.

The reconfiguration of the washer is achieved using a secure wireless channel. This channel can be initiated in one of two ways.

The first involves the use of a near-field wireless channel to open up a secured dialogue from the reader to the washer. This has the benefit of providing power to the washer in the event that the on board battery has been depleted. Acknowledgement of the presence of the near-field channel is communication using a second far field channel and subject to the system securing the channel, the near-field channel may be removed leaving the far-field channel operational. This allows simple and quick registration of a washer to the system for use in a real-time mode of operation. The reader creates the near-field channel by means of an antenna tethered to the reader. This antenna is in a form that allows the antenna to be clipped and located on the washer. While not necessary for registration purpose, the near-field antenna clip allows the antenna to be held onto the washer temporarily allowing the washer battery to be recharged using the near-field. Note that transmission of data over the near-field and battery charging can be achieved simultaneously.

The second method by which the washer can enter a reconfiguration state is by means of a wake-on-radio command. In this instance a passive or semi-passive far-field wireless circuit allows a defined wireless signal to wake the washer from a dormant state; subject to a successful security challenge and response the washer is then reconfigured and operates using a far-field channel. Note, the wake-on-radio may be achieved using the same wireless channel (carrier frequency) as used by the washer in normal use, or it may use a separate channel (different carrier frequency).

The main or only difference between real-time monitoring mode and remote condition monitoring mode is the sample rate. In practice the method of sampling is the same, however the difference in performance stems from the fact that, in real-time monitoring, data from the reader 200 is relayed to a display 400 and stored; in remote condition monitoring the data from a reader 300 has to traverse a network to the user 500 which takes longer. Therefore, the maximum sampling rate of the washer in real-time monitoring mode is limited by the bandwidth of the reader 200 to tablet 400 communications channel.

It is apparent therefore that there will also be a maximum sampling bandwidth associated with the washer to reader wireless channel and also a sampling bandwidth of the electronics that sample the sensor, i.e.

$T_s$ (reader-tablet)<$T_s$(washer-reader)<<$T_s$ (sensor-washer)

In order to increase the utility of the washer, in terms of its ability to sample at higher rates so as to extract more information from the parametric sensors, there is a need to break the sampling bottlenecks. In order to achieve this, the washer 1000 is equipped with fast acting memory 1020 to which the sensor data is written. The memory allows the data to be downloaded at a rate slower than at which the sensor was sampled. This results in a file or clip of sensor(s) data, sampled at a much higher rate. In so doing the sampling rate of the sensors embedded in the washer is now limited by the write speed to memory and the duration of the sensor "clip" of data is determined by the write speed to memory and the capacity of the memory.

In order to effectively use the high sampling capability provided by the memory, it is necessary to provide the system with a signal that initiates the sampling of data and the writing of the samples to memory. The washer achieves this in two ways. One, the washer is configured to use an exception alert from one of the embedded sensors to trigger the sampling and storage of data. This is an elegant solution but is limited due to the delay between the sensor experiencing an exception and the finite time needed before data can be acquired and stored; this latency can result in loss of data, immediately after the trigger. An alternative is to use the wake-on-radio signal to trigger data acquisition and storage. This external trigger has the benefit of being able to initiate sampling and storage in advance of an event.

The wake-on-radio trigger is generated by a reader 2000 and can be initiated using a pushbutton (user request) or automatically derived from another signal. Such signals could be but are not limited to time, temperature, communication signal, control signal to some other apparatus etc. As such the readers must have the facility to acquire such signals. As a result the readers provide interfaces to which any manner of sensors, apparatus, machines, networks and such can be connect and from which a wake-on-radio signal may be derived.

In addition to using these interfaces to generate wake-on-radio triggers, these signals can also be stored to memory in the readers. In so doing, data sets from sensors connected to the periphery of an asset can be observed with data collected from the asset itself. In so doing causes and effects may be identified.

Clearly the additional sensing and storage capabilities of the first and second readers enable them to be used as a high speed data logger, since the embedded memory allows data to be offloaded at convenient time and at a slower rate if required by the constraints of the communications channels.

While offering considerable flexibility, at a system level the smart ecosystem communicates two types of data, a datagram and a data-clip.

Datagrams are fixed length packets that have multiple fields and they are the default data transmission method. Every transmission from a washer, results in a datagram that is sent to the smart cloud and database, with the exception of the transmission of a data clip.

Data clips are treated differently since they are files that are downloaded. Every time a clip is downloaded, a datagram with details of the data to be downloaded, clip ID etc., is transmitted.

As a result the smart database is split into two components.

The first contains datagrams that detail all the washer data and control requests, these include component ID's data and information about the system and in the case of data-clip (data file) datagrams, the address (location) where the data-clip is stored. The second part of the database is the area where the data-clips are stored.

Figure 12:
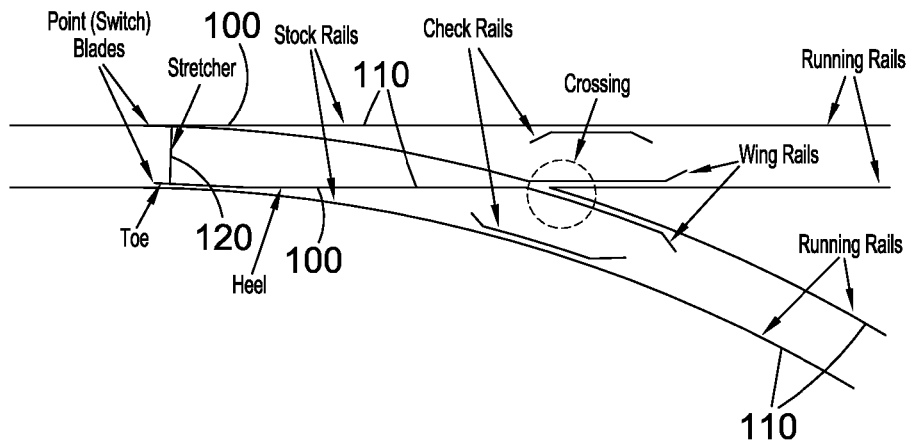
FIG. 12 shows a switch rail, suitable for use with apparatus according to embodiments of the present invention.

FIG. 12 shows a switch rail suitable for use with apparatus according to embodiments of the present invention.

Switch rails are used to move trains between tracks. This is achieved by moving the switch rails 100 between two sets of running rails 110. Movement of the switch rails is effected by a motor (not shown), and correct movement must be ensured to avoid the risk of a derailment. Correct movement of the switch rails means that the rails open and close properly and also that the separation between the rails remains constant. Separation is maintained by means of stretcher bars 120

Stretcher bars are components that ensure the switch rails on points and crossings are correctly adjusted (in terms of displacement between the two rails) and that this displacement is maintained as the rails are switched to enable trains to change direction. The adjustment is made and the settings retained by the use of nuts and bolts that must be held together with a clamp force of 62500N, 250 Nm torque.

However, at any point in time the operator may like to know:
1. Are the nuts and bolts are installed correctly?
2. Is the joint correctly tightened, not over tightened or too loose?
3. A warning if the joint is coming loose.
4. Whether the switch is compliant, when was it last checked, what was done and when should it next be checked?

The installation and maintenance of such assets is conducted by humans and is therefore prone to error (process failure). However, this is exacerbated by the fact that the only instrument available to check these items is a torque wrench.

Torque measurement is inherently unreliable for the following reasons
Torque is a poor proxy for the measurement of pre-load.
Torque varies as a function joint friction.
Thread burrs can lead to high torque values, yet joints are loose.
Torque wrenches need to be calibrated
There is no automated system to show that any specific joint has been torqued.
When checking joints, fasteners are either over-tightened or released and re-tightened, both carry risks.

The best method would be to measure the clamping-force exerted on the joint, and this is what the smart washer can do.

Case Study 1, Switch and Stretcher Bar Monitoring

During installation, the washer that is to be used is registered with the system and configured into real-time monitoring mode. As part of this process a specific washer, specific reader, specific tablet and specific user are all linked by means of component IDs and the password of the user. These appear in a time-stamped datagram. As the joint is torqued tight, the applied clamp-force is viewed on the tablet. The tightening event can be recorded as a data clip or a "compliant" data clip can be generated.

The smart ecosystem guarantees that the bolt has been installed, that it has been fastened to specification and that the instrumentation used and person who conducted the work are recorded.

Once the installation has been completed, the washer can be placed in the RCM mode whereby periodic measurement of clamp-force and other parameters are sent to the database, thus reporting the health of the asset.

The periodic transmission of asset condition data allows the maintenance to be planned. At present maintenance is performed as a periodic routine inspection. The technology has the ability to impact the maintenance in two ways: Firstly, the RCM mode data can be used to replace periodic routine maintenance with just-in-time or on-alert maintenance.

Secondly, during site inspection the system provides a superior method of asset inspection.

During an inspection the washer may be accessed to report the existing conditions of the joint and if it is compliant no mechanical intervention need be performed. As ever a datagram is produced that confirms the asset state, thereby providing proof that the maintainer has assessed that asset and that this fact has been relayed to the asset owner together with who did the maintenance.

Often assets can behave in unusual ways. For example, while a stretcher bar may be compliant over-time, the adjustment in the switch drive motor or shaft may change due to the motion of the switch resulting in wear. As such the rails may now bang into-one another for example. Without suitable instrumentation such events are difficult (costly) to assess and even more so if this needs to be performed routinely. The ability of the smart washer to work as an instrument in both RCM and RTM modes allows such instances to be detected and measured efficiently. For example, the movement of a switch could be sampled by all the washers present on that switch, providing they we working in the RTM mode. For example, the on-board accelerometers in all or a selected few washers could be used to collect acceleration profiles of components to which the washer was attached. (Indeed the clamp force could be used to indicate that the washer was correctly fastened to an asset.) Observing the acceleration profiles over time would enable changes in profile (asset performance) to be observed and also allow the mechanism behind such changes to be identified.

In this example the acceleration experienced by the on board accelerometer could be used to trigger fast sampling of the accelerometer. Alternatively, a control signal to the switch drive motor, or the drive motor current itself, could be used to generate a wake-on-radio signal to trigger the fast sampling of the accelerometer. In this latter example the readers can be used to measure the motor drive signal and compare it with the output driven signal of the asset, as recorded from the washers mounted on the parts of the asset that moves.

The SW can communicate with a motor or actuator, for example at points or at a motor mount and cross-reference a benchmark vs. actual performance.

Another aspect of this example is the fact that the stretcher bars are relatively flimsy. If one of the driven rails hits the stock (stationary) rail, the force has the capacity to bend the stretcher bar leading it to vibrate. The shock, vibration in three possible axes and inclination can all be measured and determined from the accelerometer data. In addition to this other vibration may be measured as trains pass overhead and changes in track geometry (dynamic and static) can be detected by the use of the accelerometer and the inclinometer.

The system is capable of providing large quantities of data. This data needs to be presented in specific ways determined by activity and user requirements.

The database comprises data-grams and data-clips. These are available via standard network services that allow features such as email and text alerts. Data can be viewed in graph, table or dashboard element views. Time trends thresholds etc.

An important feature is the smart API, this is a piece of software that allows third parties access to the database.

The database is accessed via a pc and has an interface biased toward RCM activities.

The real time interface is focused on portable devices and has a set of features that includes the ability to configure the washers and present data from washers and readers accordingly. Specific fields will be linked to user privileges.

Case Study 2: Flange Tensioning Trainer

Figure 13:
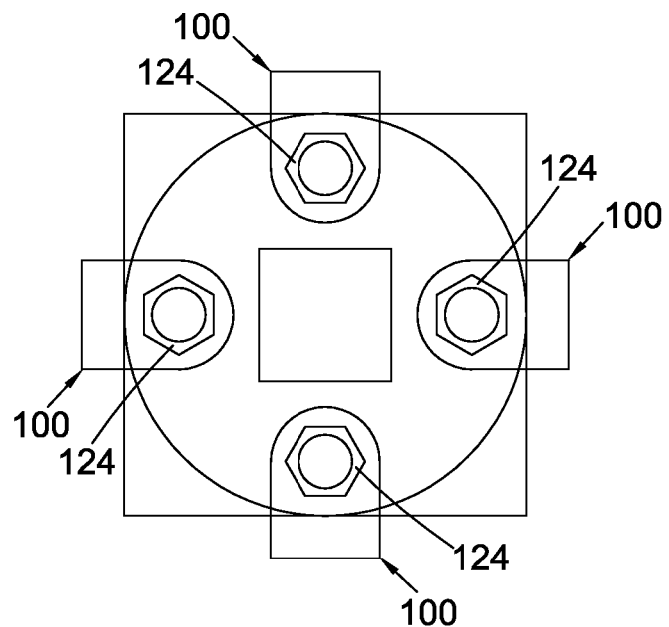
FIG. 13 shows a training device using sensing apparatus according to embodiments of the present invention.

Seals are an important component in the mechanical pipework joints as found in petrochemical, power and processing plant. The success of the seal is not only dependent on the joint having the correct clamping force but is also dependent on the order in which the clamp force is applied to the studs applying force to the flange. Failure to administer the correct forces in the correct order, in the correct steps can lead to kinking or distortion of the seal leading to leaks. For this reason, seal manufacturers invest considerable time, effort and cost in teaching maintenance teams to correctly install the seals. A typical seal flange with four smart washers 100, beneath four tightened nuts 124 is shown in FIG. 13.

Using the smart washers, reader and tablet, the application of clamp-force to the studs can be observed. In particular, the order in which the studs are tightened, and the clamp force exerted, may be accurately monitored to ensure compliance.

Whilst endeavouring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

Figure 14:
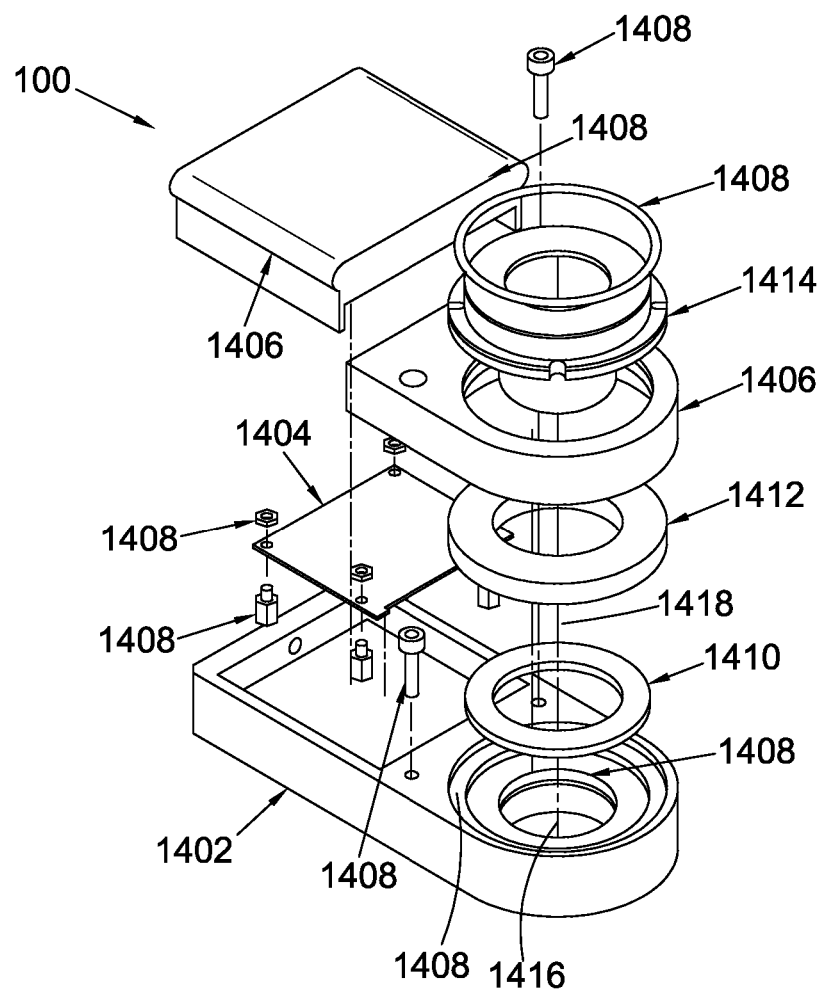
FIG. 14 shows an exploded view diagram of a sensor unit.

FIG. 14 shows an expanded view of an alternative sensor unit or type functioning as a washer, or "smart washer". A base 1402 supports electronics 1404 and a number of sensor components that are enclosed in housings or covers. Various fixings and seals 1408 secure the housing and components together. The main sensor components include a sensor head 1410 connected to the electronics 1404, a resilient member in the form of a Belleville washer and a piston 1414. The piston is in the form of a cylinder having a face for engaging a fixing at a proximal end and a flange extending distally for passing through the sensor head 1408. The piston, housing etc. define a tube 1416 having an axis 1418 passing therethrough. The housing is planar and the axis 1418 extends perpendicularly from the housing. Other arrangements are possible depending on the installation condition or location. The base can be adapted to have rotation-limiting features and/or an interface to improve engagement and inhibit movement on the surface to which it is mounted.

In use, a bolt would be passed through the tube portion 1416 of the housing, and thus through the piston. The bolt head or nut attached to the bolt would secure the sensor unit or washer against a secure surface. The base 1402 would butt against this surface and the nut would tighten down upon the bolt until contact was made with the proximal end of the piston. The sensor head 1408 can measure the displacement of the nut towards the surface by the amount the proximal end of the piston enters the sensor head. The resilient member, or washer, such as a Belleville washer, provides for a quantifiable degree of displacement. To be clear, the force of a tightening nut functions to displace the piston against the resilient member and allow the distal end of the piston to move through the sensor head. The force required to compress the resilient member is known.

Washers and pistons of the sensor units can be provided with different diameters to accommodate different bolts and nuts etc., or other such fixings.

The tube is not limited to being cylindrical in nature.

The resilient member can have a plurality of washers, such as Belleville washers.

The provision of a piston functions to isolate the fixing material from the sensor head. In this way the materials influence on the sensor is inhibited. Further, the piston isolates the rotational forces applied to a fixing from the resilient member—this functions to inhibit movement of the washer. The piston can be fixed to inhibit rotation to inhibit rotation to the resilient member. These adjustments, alone or in combination, can minimise variations in values that occur as a result of the resilient member or washer having tolerance variations around its edge. Flat areas can be provided on the edge of the washer to increase the load bearing area and inhibit deformation.

Figure 15:
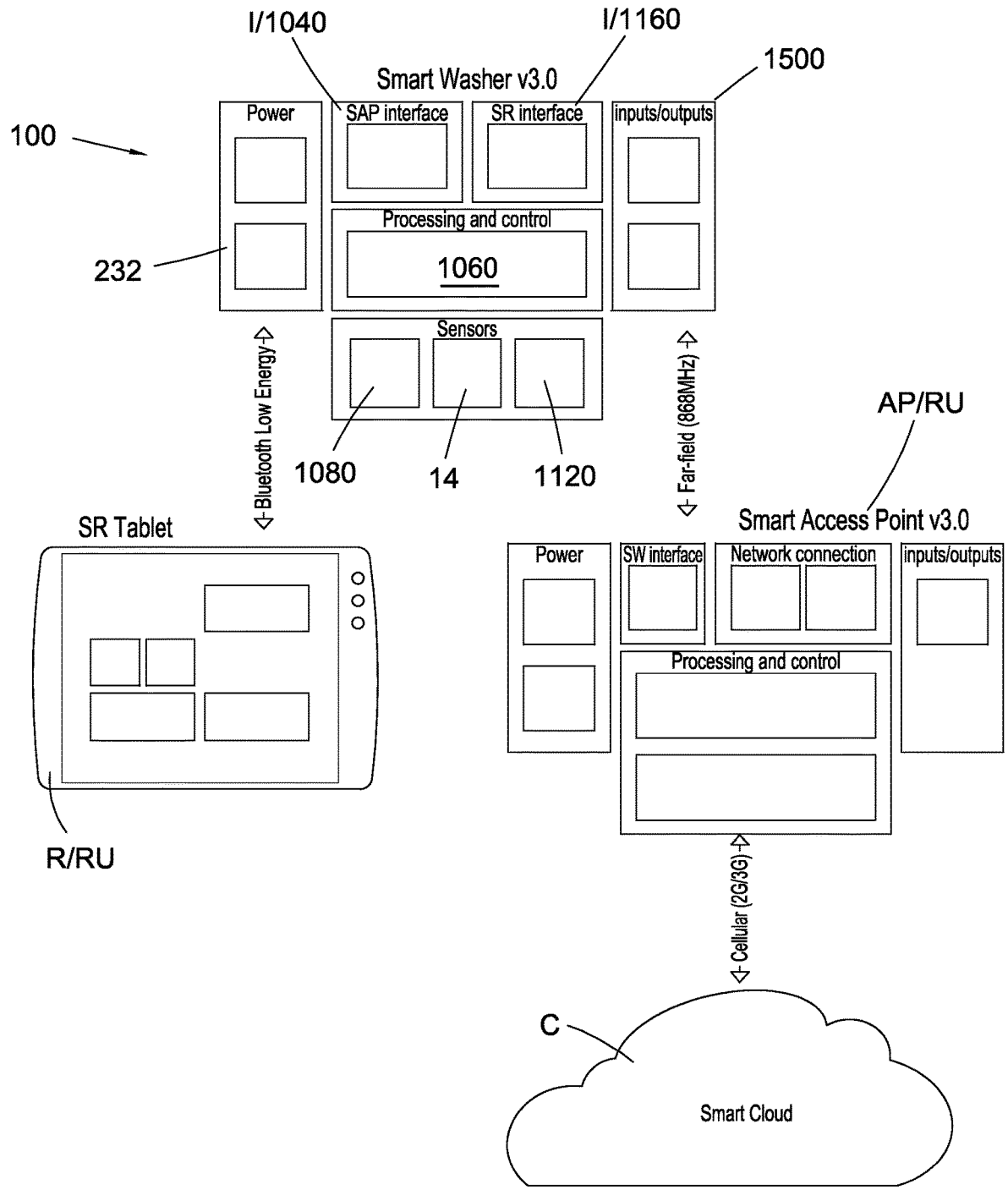
FIG. 15 shows a system incorporating the sensor and system components supporting said sensor.

FIG. 15 is an overview of a system having a washer 100, 1500, for extracting data from the sensor unit 100 to present it to an end user. The washer has communication interfaces I, 1040 (for far-field communications in the region of 868 MHz) and I/1160 (for local low-energy communications using, for example, Bluetooth). The washer has a power supply 232, sensors, 1080, 114, 1120, a controller 1060 and input/output interfaces. Data is typically extracted from the washer 1500 in packets for efficient and low-power communication of data and sent to an access point AP, RU that has further processing functions and network communications. The access point can relay data in packet or file format to a remote server over the 'cloud'. A portable device R, RU can be used to access data directly from any one of the washer, the access point and/or the remote server.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A sensor unit for measuring and monitoring a plurality of parameters associated with an asset or equipment having a fixing connected thereto, said sensor unit having:
    a housing having a clamping region for receiving a fixing therethrough and a resilient member, wherein the fixing is biased against the resilient member;
    sensors arranged to measure and/or monitor (i) parameters associated with a fixing that is secured to the asset via housing and/or (ii) parameters influencing the performance of the asset, wherein at least one of the sensors measuring parameters associated with the fixing is configured to measure a clamp force applied to the clamping region between the fixing and the asset;
    a processor configured to process data from the sensors; and
    a communicator adapted to transmit said data to a remote device.

2. A sensor unit according to claim 1, wherein the housing has a tubular portion for receiving a fixing therethrough.

3. A sensor unit according to claim 1, wherein at least one of the sensors measuring parameters associated with a fixing is an inductive sensor.

4. A sensor unit according to claim 3, wherein the inductive sensor measures the displacement or force applied to a fixing against the asset to which it is fixed, said fixing is biased against the resilient member located in the housing.

5. A sensor unit according to claim 4, wherein the resilient member is a spring.

6. A sensor unit according to claim 1, wherein the housing and sensor is adapted to receive a fixing attached to an asset, said fixing receivable by the sensor, wherein the sensor has a protrusion displaceable by said fixing towards or through a sensor against a resilient member therebetween, the displacement of the protrusion being proportional to the force applied to the sensor unit.

7. A sensor unit according to claim 6, wherein the housing and sensor is adapted to receive a fixing attached to an asset, said fixing receivable by a piston of the sensor that extends through an inductive loop, the position of the piston in relation to the loop being readable such that the processor can calculate the force applied to the sensor unit, the displacement of the piston towards the loop being regulated by a sprung washer.

8. A sensor unit according to claim 1, wherein the sensor unit is configured to communicate with a monitoring system having a reader for receiving data associated with measured parameters, the sensor unit configurable to operate in at least one of a plurality of modes including:
    a first mode, in which the sensor unit samples one or more parameters periodically at a first sample rate,
    a second mode, in which the sensor unit detects the occurrence of an event, and
    a third mode, in which the sensor unit monitors one or more parameters periodically at a second sample rate, which second sample rate is greater than the first sample rate,
    and wherein the data obtained in said modes is communicable with the system and/or the reader.

9. A sensor unit according to claim 1 wherein the unit is configurable to sample, or measure and communicate data to a remote device to enable measurements to be calculated, in real-time.

10. A sensor unit according to claim 1, wherein the unit measures:
    the clamp force between the fixing and the asset; and
    at least one of
        acceleration,
        inclination,
        pressure,
        shock,
        temperature,
        magnetic field strength,
        battery capacity/charge,
        identification number,
        wireless quality of service/signal strength,
        battery capacity or level,
        displacement and
        the levels of hydrocarbon gases present around the sensor unit.

11. A sensor unit according to claim 1, wherein the unit communicates to a remote device via at least one of a near-field communications module, a wake-on-radio module, a far-field communications module, a wired communications unit and a wireless communications unit.

12. A sensor unit according to claim 1, wherein the unit is configured to communicate with one or more other sensor units, configure one or more sensor units, store, process, relay and/or display data from one or more sensor units, act as an intermediary between one or more sensor units and an function as an interface unit with other sensor units.

13. A sensor unit according to claim 1, wherein the unit is adapted for two-way communications.

14. A sensor unit according to claim 1, wherein the sensors are calibrated from a remote device.

15. A system for measuring and monitoring a plurality of parameters associated with a plurality of assets having a sensor unit according to claim 1 fixed to said assets with a fixing.

16. A method of measuring and monitoring a plurality of parameters associated with an asset or equipment having a fixing connected thereto, said method including:
    installing a sensor unit according to claim 1;
    measuring and/or monitoring (i) parameters associated with a fixing that is secured to the asset via housing and/or (ii) parameters influencing the performance of the asset;
    processing the data from the sensors; and
    communicating said data to a remote device.

17. A computer readable storage medium comprising computer-executable instructions which, when executed, configure a processor to perform the method of claim 16.

18. A sensor unit according to claim 3, including at least one resilient washer and sensor electronics, wherein the inductive sensor, the at least one resilient washer and the sensor electronics are mounted in the housing, the housing includes a base and the inductive sensor is located between the base and a major surface of the at least one resilient washer.

19. A sensor unit according to claim 18, including a piston mounted in the housing.

20. A sensor unit according to claim 19, wherein the piston includes a planar face at a first end for engaging the fixing.

21. A sensor unit according to claim 19, wherein the piston is arranged to be displaced by the fixing against the at least one resilient washer thereby transferring force from the fixing to the at least one resilient washer.

22. A sensor unit according to claim 18, wherein, while the sensor unit is in use, the at least one resilient washer provides a quantifiable degree of displacement, which is indicative of the force applied to the sensor unit by the fixing.

\* \* \* \* \*